United States Patent Office 3,518,310
Patented June 30, 1970

3,518,310
PREPARATION OF β-HYDROXYPROPIONALDE-
HYDE AND β-ALKOXYPROPIONALDEHYDES
Eugene F. Lutz, Concord, Calif., assignor to Shell Oil
Company, New York, N.Y., a corporation of Delaware
No Drawing. Filed Feb. 9, 1968, Ser. No. 704,257
Int. Cl. C07c 45/00
U.S. Cl. 260—602                            2 Claims

ABSTRACT OF THE DISCLOSURE

Hydroxylic compounds are added to acrolein in the liquid phase in the presence of carbon dioxide as catalyst.

BACKGROUND OF THE INVENTION

It has long been known that hydroxylic compounds such as alcohols and water can be added to the olefinic double bond of acrolein to form the corresponding β-ether-substituted propionaldehydes or β-hydroxypropionaldehyde. However, as a practical matter, preparation of these β-substituted propionaldehyde products by this addition reaction has been found to be very difficult. Both the olefinic double bond and the aldehyde group of acrolein are highly reactive under acidic reaction conditions, so that a number of reactions are possible. On the other hand, in the base catalyzed addition of hydroxylic compounds to acrolein, various reactions involving condensation and/or polymerization of the acrolein and/or the hydroxylic compound occur to a major extent.

In view of the variety of products that can be produced by the reaction of hydroxylic compounds and acrolein, the preferential formation of β-substituted propionaldehyde product has been achieved only by the empirical selection of catalysts and/or by carefully controlled reaction conditions. In U.S. 2,504,680 of Gresham, issued Apr. 18, 1950, a process for preparing β-alkoxypropionaldehyde from acrolein and alcohols is disclosed using sodium methoxide as catalyst. It is essential in this process to operate at low temperatures, e.g., 0°–15° C., and to slowly and gradually add the acrolein to the alcohol and catalyst components in order to avoid formation of polymerization and condensation products. U.S. 2,704,298 of Bellringer, issued Mar. 15, 1955, discloses a process for addition of alcohols to acrolein which comprises (1) effecting the addition of alcohol in the presence of an alkaline catalyst, (2) buffering the resulting reaction mixture to a pH of between 2.5 and 7.5, and (3) rapidly recovering the β-alkoxypropionaldehyde product by distillation. According to U.S. 2,288,211 of Schulz, issued June 30, 1942, a process of preparing β-alkoxypropionaldehyde is accomplished by allowing the reaction of acrolein and alcohol to proceed to the diacetal of β-alkoxypropionaldehyde and, in a second step, hydrolyzing the diacetal product with an acid catalyst to obtain the desired β-alkoxypropionaldehyde product. U.S. 2,694,-732 and 2,694,732 of McTeer et al., issued Nov. 16, 1954, propose to react the alcohol and acrolein in the presence of an amine as catalyst, in a reaction medium in which the pH is carefully controlled to maintain a neutral to slightly acid condition. The pH of a given medium is controlled by choosing an amphoteric amine which will provide the required pH, or by employing a basic amine and adding a carboxylic acid in the amount necessary to provide the required pH. However, in addition to suffering from the need to carefully buffer the reaction medium with expensive compounds such as amines and carboxylic acids, it has been disclosed by U.S. 2,967,889 of White et al., issued Jan. 10, 1961, that these processes of McTeer et al. are subject to many inherent difficulties due to the nature of the catalyst system. For example, the amine salts of the carboxylic acids formed from the amines and carboxylic acids often are unstable, decomposing into the precursor amines and carboxylic acids. Further, in many cases the amines and/or the carboxylic acids involved tend to be volatile under the conditions present during recovery of the β-alkoxypropionaldehyde products by distillation of the final product mixtures, so that the β-alkoxypropionaldehyde product almost always is contaminated by the amines and/or the acids. Accordingly, U.S. 2,967,889 of White et al. teaches that the disadvantages of the McTeer et al. processes are obviated by employing non-volatile catalysts, so that recovery of an uncontaminated product is easily accomplished. Similarly, U.S. 3,006,960 of Luten et al., issued Oct. 31, 1961, teaches the use of non-volatile and high-boiling catalyst species, e.g., long-chain carboxylic acid salts, to effect the addition of alcohols to acrolein.

SUMMARY OF THE INVENTION

It has now been found that β-substituted propionaldehydes are advantageously prepared by the addition of hydroxylic compounds to the olefinic double bond of acrolein in liquid phase reaction medium in the presence of carbon dioxide as catalyst. The process of the invention effects the addition of aliphatic alcohols to acrolein to yield the corresponding β-ether-substituted propionaldehyde or the addition of water to acrolein to yield β-hydroxypropionaldehyde as the major products, is characterized by the use of gaseous, volatile carbon dioxide as catalyst, which is readily available and easily separated from the product mixture, and does not require careful buffering of the reaction medium.

DESCRIPTION OF PREFERRED EMBODIMENTS

The reactants and catalyst: The hydroxylic compounds employed in the process include water and hydrocarbon monohydric aliphatic alcohols of from 1 to 10 carbon atoms. Preferred hydroxylic compounds are hydrocarbon monohydric aliphatic alcohols of from 1 to 6 carbon atoms, especially primary monohydric alkanols such as methanol, ethanol, n-proponol, n-butanol, isobutanol and n-hexanol.

In the process of invention, one mole of the hydroxylic compound reacts with one mole of acrolein to yield the β-substituted propionaldehyde product. However, since the hydroxylic compounds make excellent diluents for the reaction, it is preferred that they be used in molar excess to provide the liquid reaction medium of the process. Generally, molar ratios of hydroxylic compound, e.g., alcohol or water, to acrolein of about 2:1 to about 20:1 are satisfactory with molar ratios of about 3:1 to about 10:1 being preferred.

Although methacrolein and acrolein are operable in the process of the invention, the use of acrolein is particularly preferred. In general, any commercially available grade of acrolein of reasonable purity is suitably employed in the process. Commercially available acrolein often contains a small quantity (usually a fraction of one percent by weight) of a polymerization inhibitor such as hydroquinone. While the presence of such a polymerization inhibitor is not essential to the process of the invention, the presence of such an inhibitor does not have a deleterious effect. In some instances, e.g., when pure acrolein is employed, it is often advantageous to add a small amount, e.g., about 0.1% to about 0.5% by weight based on acrolein, of such an inhibitor to the reaction mixture.

Essential to the process of the invention is the presence of carbon dioxide. Commercially available grades of carbon dioxide of reasonable purity is usually satisfactory. The carbon dioxide is generally provided in initial pressures of from about 5 p.s.i.g. to about 1000 p.s.i.g., although pressures of from about 10 p.s.i.g. to about 200 p.s.i.g. are preferred.

Reaction conditions: The process of the invention is conducted in the presence or in the absence of an additional reaction diluent. In modifications where a diluent is employed, diluents that are liquid at reaction temperature and pressure and are inert toward the reactants and products thereof are suitably employed. Illustrative of suitable diluents are saturated hydrocarbons such as hexane and decane; aromatic hydrocarbons such as benzene and toluene; and ethers including dialkyl ethers such as diethyl ether, dipropyl ether and methyl octyl ether and cyclic ethers such as 1,4-dioxane, 1,3-dioxane and tetrahydrofuran.

The process of the invention is conducted by any of a variety of procedures. In one modification, the hydroxylic compound, acrolein, carbon dioxide and any diluent employed are charged to an autoclave or similar pressure reactor for operation in a batchwise manner. In another modification, reaction is effected in a continuous operation as by contacting the entire reaction mixture during passage through a tubular reactor. In yet another modification, one reaction mixture component is added to the others, as by gradually adding the acrolein to a mixture of the hydroxylic compound and catalyst maintained at reaction temperature and pressure. In any modification, the reaction is carried out at elevated temperatures. Suitable temperatures vary from about 35° C. to about 150° C. although temperatures of from about 50° C. to about 100° are preferred.

Subsequent to reaction, the reaction mixture is separated and the desired products are recovered by conventional means such as selective extraction, fractional distillation and chromatographic techniques.

The products: The addition of water to acrolein produces $\beta$-hydroxypropionaldehyde and the addition of the primary monohydric alkanols to acrolein produces $\beta$-alkoxypropionaldehydes. The $\beta$-hydroxypropionaldehyde and $\beta$-alkoxypropionaldehyde products are compounds of established utility in a variety of applications. For example, hydrogenation of $\beta$-hydroxypropionaldehyde over platinum on carbon gives trimethyleneglycol which is a chemical of commerce with utility as the precursor for such products as sebacate polyesters, as disclosed by U.S. 2,423,093 of Frosch, issued July 1, 1947, and reductive-amination of $\beta$-ethoxypropionaldehyde with ammonia and hydrogen in the presence of Raney nickel produces 3-ethoxypropylamine which resembles morpholine in its ability to produce salts with organic acids that are useful as emulsifying agents, as disclosed by Smith, "Acrolein," Wiley and Co., New York, 1962, p. 114.

To further illustrate the improved process of the invention, the following examples are provided. It should be understood that the details thereof are not to be regarded as limitations as they may be varied as will be understood by one skilled in the art.

EXAMPLE I

A mixture of 16.8 g. of acrolein, 82.8 g. of ethanol, 1 g. of water, 800 p.s.i.g. of carbon dioxide and about 0.1 g. of hydroquinone was charged to an autoclave and maintained at a tempertaure of 75° C. for a period of 16 hours. Quantitative gas chromatographic analysis of the reaction mixture showed a 23.2% conversion of acrolein and a 76.5% yield of $\beta$-ethoxypropionaldehyde.

EXAMPLE II

By a procedure similar to that of Example I, a mixture of 16.8 g. of acrolein, 88.8 g. of n-butanol, 1.6 g. of water, 790 p.s.i.g. of carbon dioxide and about 0.1 g. of hydroquinone was heated at temperature of 75° C. for 15.5 hours to give 23.2% conversion of acrolein and a 64.4% yield of $\beta$-n-butoxypropionaldehyde.

EXAMPLE III

By procedure similar to that of Example I, the hydration of acrolein to $\beta$-hydroxypropionaldehyde was conducted in a series of reactions with the amounts of reactants and under the reaction conditions shown in Table I. All reactions were inhibited with a small amount of hydroquinone.

Upon the completion of each reaction, the unreacted acrolein was recovered from the reaction mixture with a rotary evaporator at a temperature of 45–50° C. and at a pressure of about 150 mm. of Hg. The amount of $\beta$-hydroxypropionaldehyde contained in the reaction mixture was determined by hydrogenation of the $\beta$-hydroxypropionaldehyde to trimethyleneglycol over 3.0 g. of 10% platinum on carbon at about 1500 p.s.i.g. of hydrogen at temperature of about 20–25° C. for about 17 hours and then at 50° C. for ½ hour and by distillation of the trimethyleneglycol product. The acrolein conversion and the yield of $\beta$-hydroxypropionaldehyde (analyzed as trimethyleneglycol) obtained in each of the reactions are shown in Table I.

TABLE I

| Expt. | Acrolein, moles | $H_2O$, g. | $CO_2$, p.s.i.g. | Temp., °C. | $CH_2$=CHCHO Conv., percent | $HOCH_2CH_2CHO$ Yield, percent |
|---|---|---|---|---|---|---|
| 1 | 0.27 | 68 | 100 | 50 | 43.5 | 86.2 |
| 2 | 0.27 | 68 | 120 | 50 | 51.7 | 80.6 |
| 3 | 0.27 | 68 | 130 | 75 | 54.4 | 64.1 |
| 4 | 0.27 | 125 | 135 | 58 | 57.0 | 81.1 |
| 5 | 0.27 | 68 | 725 | 50 | 32.0 | 81.4 |
| 6 | 0.27 | 68 | 770 | 50 | 28.9 | 71.3 |
| 7 | 0.27 | 68 | 750 | 56 | 28.5 | 74.2 |
| 8 | 0.33 | 83.9 | 35 | 50 | 68.0 | 67.2 |
| 9 | 0.334 | 83.9 | 15 | 50 | 67.8 | 64.2 |
| 10 | 0.334 | 83.9 | 100 | 58 | 52.8 | 71 |
| 11 | 0.334 | 83.9 | 68 | 50 | 62.7 | 69.1 |
| 12 | 0.334 | 83.9 | 120 | 55 | 75.8 | 70.7 |

I claim as my invention:
1. The process of producing $\beta$-hydroxypropionaldehyde by the addition of water to acrolein or methacrolein, the molar ratio of water to acrolein or methacrolein being from about 2:1 to about 20:1, in liquid phase in the presence of from about .5 p.s.i.g to about 1000 p.s.i.g. of carbon dioxide at a temperature of about 35° C. to about 150° C, whereby $\beta$-hydroxypropionaldehyde and $\alpha$-methyl-$\beta$-hydroxypropionaldehyde are produced, respectively.
2. The process of claim 1 wherein the water is added to acrolein at a carbon dioxide pressure of about 10 p.s.i.g. to about 200 p.s.i.g.

References Cited

UNITED STATES PATENTS 2,434,110    1/1948    Hatch et al. _____ 260—602

FOREIGN PATENTS 1,224,297    9/1966    Germany.

LEON ZITVER, Primary Examiner
R. H. LILES, Assistant Examiner

U.S. Cl. X.R.
260—635